United States Patent
Kolev et al.

(10) Patent No.: US 6,181,932 B1
(45) Date of Patent: Jan. 30, 2001

(54) METHODS AND SYSTEMS FOR REDUCING LOCATION UPDATE PROCEDURES IN SATELLITE COMMUNICATIONS SYSTEMS

(75) Inventors: Javor Kolev; Richard Weiss; Hakan Lindvall, all of Cary, NC (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/030,035

(22) Filed: Feb. 25, 1998

(51) Int. Cl.$^7$ .................................................. H04Q 7/20
(52) U.S. Cl. ........................................... 455/428; 455/435
(58) Field of Search .................................. 455/442, 432, 455/435, 427, 428, 429, 430

(56) References Cited

U.S. PATENT DOCUMENTS

| | | | |
|---|---|---|---|
| 5,521,961 | * | 5/1996 | Fletcher ................................. 379/59 |
| 5,543,813 | | 8/1996 | Araki et al. ........................... 342/357 |
| 5,732,359 | * | 3/1998 | Baranowsky .......................... 455/552 |
| 5,790,953 | * | 8/1998 | Wang ..................................... 455/435 |
| 5,842,127 | * | 11/1998 | Pashtan ................................. 455/435 |
| 5,890,062 | * | 3/1999 | Courtney .............................. 455/428 |
| 5,946,619 | * | 8/1999 | Kolev .................................... 455/432 |
| 5,946,620 | * | 8/1999 | Schultz .................................. 455/435 |
| 5,960,365 | * | 9/1999 | Leih ...................................... 455/552 |

FOREIGN PATENT DOCUMENTS 0 663 736 A1    7/1995 (EP) .

* cited by examiner

*Primary Examiner*—Thanh Cong Le
*Assistant Examiner*—Nick Corsaro
(74) *Attorney, Agent, or Firm*—Myers Bigel Sibley & Sajovec

(57) ABSTRACT

A user terminal is registered with a satellite communications system including a plurality of satellite spot beam transmitters; wherein each of the satellite spot beam transmitters defines a respective spot beam. A periodic oscillation of two adjacent satellite spot beam transmitters results in a change of geographic coverage for the respective adjacent spot beams so that the user terminal can be alternatingly covered by the first and second spot beams when the user terminal is stationary. Upon determining that the user terminal is alternatingly covered by the first and second spot beams, the user terminal is registered with a spot beam pair for both the first and second adjacent spot beams and the spot beam pair registration is stored in the user terminal memory. Communications operations between the user terminal and the satellite communications system may be terminated and later re-established, whereupon the user terminal reregisters with the spot beam pair registration stored in memory. Related user terminals are also discussed.

35 Claims, 7 Drawing Sheets

FIG. 1B
PRIOR ART
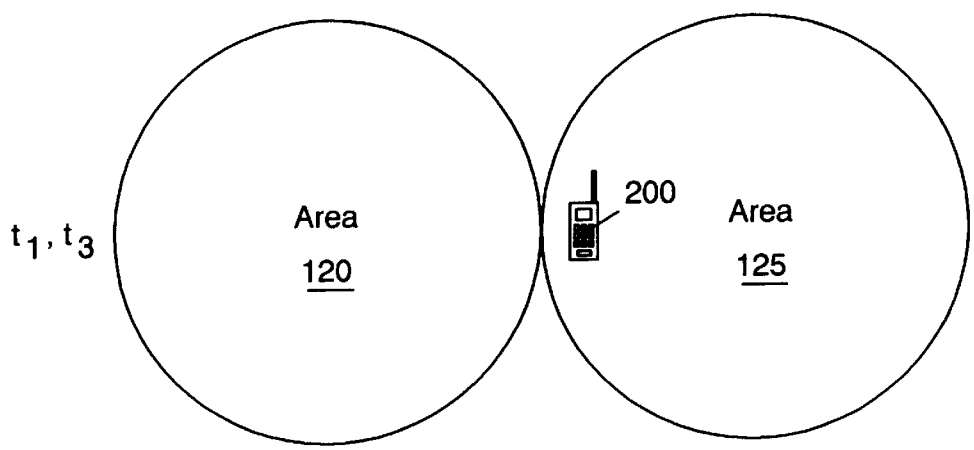
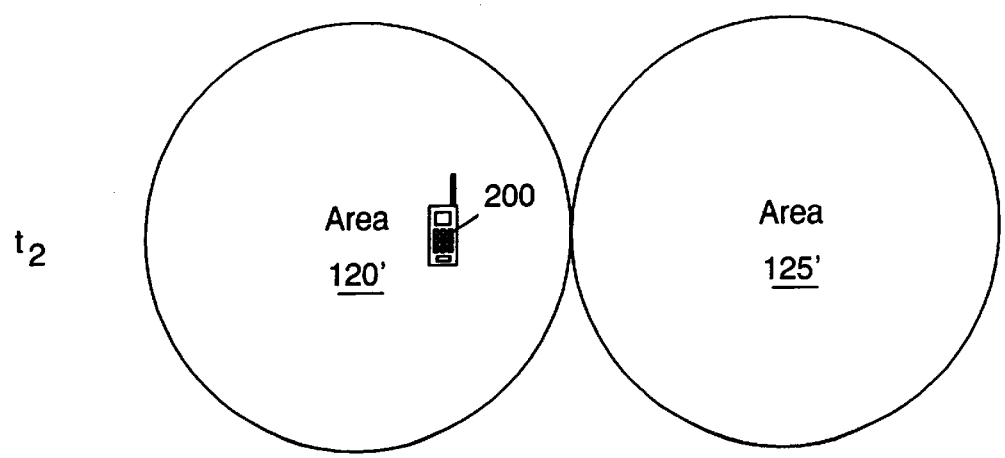
Oscillation in Spotbeam Coverage

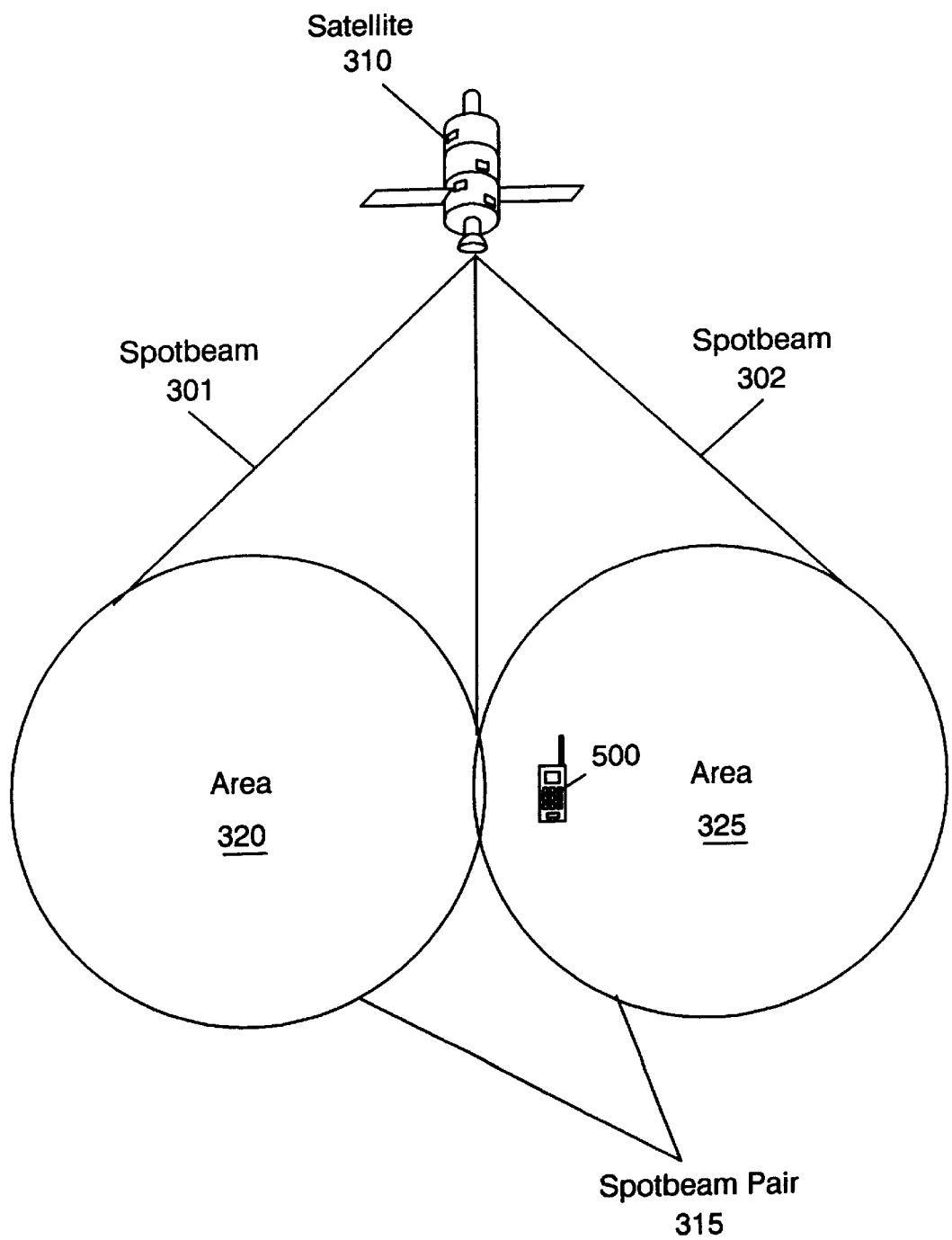

METHODS AND SYSTEMS FOR REDUCING LOCATION UPDATE PROCEDURES IN SATELLITE COMMUNICATIONS SYSTEMS

FIELD OF THE INVENTION

The present invention relates to the field of communications and more particularly to systems and methods for satellite communications.

BACKGROUND OF THE INVENTION

Mobile communication systems allow users access to a communications network through respective user terminals as the user moves within a geographic region. Some mobile communications systems partition the geographic region into areas wherein each area may be covered by a portion of the mobile communications system. Consequently, if a user moves from a first area to a second area within the serviced geographic region, the mobile communications system may stop providing service in the first area and start providing the service in the second area to maintain the user's access. The users may access the mobile communications system using a user terminal.

FIG. 1A illustrates a satellite system which provides communication service to user terminals 200 located within areas 120 and 125 via respective spot beams 101 and 102. The satellite system provides communication service to the user terminal 200 by tracking the location of the user terminal 200 within areas 120 and 125 and registering the user terminal 200 within that area. For example, if the user terminal 200 were located in area 125, the satellite system would register the user terminal 200 as located in area 125 and communicate with the user terminal 200 via spot beam 102. If, however, the user terminal 200 were to relocate to area 120, the satellite system may re-register the user terminal 200 as located in area 120 and subsequently communicate with the user terminal 200 via spot beam 101.

Spot beams 101 and 102 may provide respective communications channels for communications between the satellite 110 and the user terminal 200. A spot beam may also provide respective control channels to user terminals within the area covered by the spot beam. A control channel may carry information concerning the service provided with the area covered by the respective spot beam. For example, spot beam 102 may broadcast information over a control channel which identifies spot beam 102 to the user terminals located within area 125, and may also identify communications channels assigned to the spot beam.

The location of the user terminal 200 may be registered via a location update procedure. The location update procedure is a communications protocol whereby the user terminal 200 may notify the satellite system of the user terminal's location within the geographic region. A location update procedure may be performed when the user terminal 200 moves to a new area and requires re-registration in the new area. The user terminal 200 may initiate the location update procedure when the user terminal 200 detects that the signal strength of its present spot beam is less powerful than that of another spot beam. For example, if the user terminal 200 were located within area 125 serviced by spot beam 102 and subsequently moved to area 120, the user terminal 200 may detect the greater signal strength of spot beam 101. Upon detecting the greater signal strength of the spot beam 101, the user terminal 200 switches from the control channel associated with spot beam 102 to the control channel associated with spot beam 101 and notifies the satellite system of its new location corresponding to area 120 using the information broadcast on the control channel associated with spot beam 101. Thus the user terminal 200 re-registers with the satellite system in area 120. Subsequently, the satellite system communicates with the user terminal 200 using spot beam 101. The user terminal 200 may also perform periodic location update procedures if the user terminal 200 operates in a particular location for a long time.

Some satellites may exhibit a behavior known as an inclined orbit wherein the spot beams projected onto the geographic region periodically shift or oscillate. Such an oscillation is illustrated in FIG. 1B. At a time $t_1$, the satellite 110 services the area 120 via spot beam 101 and the area 125 via spot beam 102. The user terminal 200 is located within the area 125 serviced by spot beam 102. At a time $t_2$, the inclined orbit causes an oscillation in the spot beams covering areas 120 and 125. Specifically, spot beam 101, formerly covering area 120, now covers area 120'. Similarly, the spot beam 102, formerly covering area 125, now covers area 125'. Moreover, user terminal 200, formerly located in area 125, is now located within the area 120' serviced by spot beam 101. Thus, the user terminal 200 has experienced a shift in spot beam service without moving. At a time $t_3$, the coverage shown at time $t_1$ is restored, causing yet another shift in the coverage of the spot beams and the service to the user terminal 200. The oscillation associated with an inclined orbit may be such that the shift in spot beam coverage described in FIG. 1B happens periodically.

As described above, the user terminal 200 may initiate location update procedures upon the detection of changes in the spot beam service. At time $t_1$, for example, the user terminal 200 detects service via spot beam 102. At time $t_2$, however, user terminal 200 detects a change such that its service is provided by spot beam 101. Consequently, the user terminal 200 may initiate a location update procedure. Subsequently, the user terminal 200 may detect another shift in spot beam service when the inclined orbit causes an oscillation in the reverse direction. Consequently, the user terminal may perform yet another location update. Moreover, a location update procedure may be requested for each periodic shift in the spot beam coverage.

The user terminal 200 may be a communications device, such as a radio telephone, which is capable of communicating with satellite system. The user terminal 200 may detect the signal strength of spot beams and a beam pair location update timer within the user terminal 200 may measure time associated with a change in spot beam service. A periodic location update timer, within the user terminal 200, may measure the time elapsed since the present spot beam began servicing the user terminal 200.

In some systems, the number of user terminals located within an area affected by the periodic oscillation resulting from the inclined orbit may be significant. For example, in some systems 10% of the user terminals serviced by the satellite system may be located in areas subject to oscillations in spot beam service. Consequently, 10% of the user terminals 200 serviced by satellite communications system may initiate location update procedures upon detecting each oscillation in spot beam service. Such a significant number of location update procedures may cause a significant strain on the satellite system's resources.

Existing systems may use a registration process to reduce the number of location updates produced by oscillations in spotbeam coverage. The registration process may require each spot beam to broadcast a single location area code (LAC) which uniquely identifies the spot beam within the satellite system and a list of neighboring spot beams called "beam pairs" on the corresponding control channel. The beam pairs may also be identified by a unique beam pair LAC. For example, spot beam 102 and spot beam 101 form a beam pair 115. The control channel for spot beam 102 may therefore carry the single LAC corresponding to spot beam 102 and a list of LACs each of which correspond to a pair of spot beams. One of the LACs within the list of beam pair LACs would correspond to the beam 115 formed by spot beam 101 and spot beam 102. The user terminal 200 may receive the single LAC and beam pair LAC list broadcast on the control channel and use the LACs to register with the satellite system. Subsequently, the satellite system locates the user terminal using the LAC with which the user terminal 200 is registered. Furthermore, user terminal 200 may store the single LAC and the list of spot beam pair LACs broadcast by its servicing spot beam. When the user terminal 200 detects a shift in its spot beam service, the user terminal 200 may refer to the stored single LAC and the list of beam pair LACs to determine whether a location update procedure is necessary.

If the stored list of spot beam pair LACs indicates that the new servicing spot beam forms a beam pair with the registered spot beam, the user terminal 200 may register with the spot beam pair. For example, if the user terminal 200 were to move from area 125 to area 120, the user terminal 200 would detect the change in coverage from spot beam 102 to 101. Furthermore, the user terminal 200 would examine the single LAC broadcast by the spot beam 102 and the stored list of beam pair LACs to determine that spot beam 101 forms a pair with spot beam 102. Consequently, the user terminal 200 would register with the satellite system as being serviced by the spot beam pair formed by spot beam 101 and spot beam 102. Subsequently, any requests for communication (i.e., pages) directed to the user terminal 200 would be broadcast both on spot beam 101 and spot beam 102.

When the user terminal 200 registers with its servicing beam pair, the user terminal 200 starts a beam pair location update timer. The beam pair location update timer's duration exceeds the period of oscillation associated with the inclined orbit. For example, if the inclined orbit were such that the period of oscillation were six hours, the duration of the beam pair location update timer 220 would be greater than six hours. If the user terminal does not detect a restoration of its original spot beam coverage before the expiration of the beam pair location update timer, the user terminal 200 registers with the single spot beam currently providing service. If, however, the user terminal detects a restoration of its original spot beam service, the user terminal maintains its current registration with the beam pair and re-initiates the beam pair location update timer. By maintaining the user terminal's registration with the beam pair, the system has determined that the user terminal is located in an area subject to oscillation resulting from the inclined orbit. Furthermore, if the user terminal remains within this area, it will experience a continuous oscillation in its spot beam service.

Notwithstanding the communications systems and methods discussed above, there is a need to further reduce the number of location update procedures which occur within satellite communications systems.

SUMMARY OF THE INVENTION

It is therefore, an object of the present invention to provide improved satellite communications methods and systems.

It is another object of the present invention to provide satellite methods and systems which further reduce location update procedures.

These and other objects are provided by methods of registering a user terminal with a satellite communications system including a plurality of satellite spot beam transmitters wherein each of the satellite spot beam transmitters defines a respective spot beam. A periodic oscillation of two adjacent satellite spot beam transmitters results in a change of geographic coverage for the respective adjacent spot beams so that the user terminal can be alternatingly covered by the first and second spot beams when the user terminal is stationary. Upon determining that the user terminal is alternatingly covered by the first and second spot beams, the user terminal is registered with a spot beam pair for both the first and second adjacent spot beams and the spot beam pair registration is stored in the user terminal's memory. Communications operations between the user terminal and the satellite communications system may be terminated and later re-established, whereupon the user terminal re-registers with the stored spot beam pair registration from memory.

By re-registering the user terminal with the same spot beam pair with which the user terminal was registered before communications operations were terminated, a subsequent location update procedure can be eliminated. In systems according to the prior art, the user terminal would register with the single spot beam providing service when communications operations were re-established. If, however, the user terminal is located within an area of alternating coverage, the user terminal of the prior art will re-register when the oscillation is first detected. The methods of the present invention thus provide that a single location update is used to establish service with the beam pair when communications operations are re-established.

The present invention may also reduce the number of location updates by prioritizing beam pair location update procedures and period location update procedures. A periodic update timer is kept which initiates location update procedures according to a predetermined period to assist the satellite system in determining the accessibility of the user terminal over time. The periodic location update timer has a period which is controlled by the satellite system. A location update may be performed at the expiration of the periodic location update timer. The beam pair location update procedures are given priority over location updates stemming from the periodic location update timer by re-initiating the periodic update timer when a beam pair location update procedure is performed. The present invention can thus reduce location update procedures which would otherwise coincide with beam pair location update timers. In other words, the location update procedures can be reduced, according to the present invention, by coordinating the operation of the beam pair and periodic location update timers.

Reducing the location update procedures can be critical to the smooth operation of a satellite communication system. The present invention can reduce control channel traffic by re-registering with a beam pair which serviced the user terminal prior to terminating communication operations and by prioritizing the beam pair and periodic location updates as described above. In particular, location update procedures consume control channel bandwidth. Duplicative location updates therefore can produce system problems, particularly when a large number of user terminals, according to the prior art, may initiate needless location updates.

BRIEF DESCRIPTION OF THE DRAWINGS

FIG. 1B is an illustration of spot beam coverage oscillation due to an inclined satellite orbit according to the prior art;

FIG. 2 is block diagram of a satellite system according to the present invention;

DETAILED DESCRIPTION OF THE INVENTION

Figure 1A:
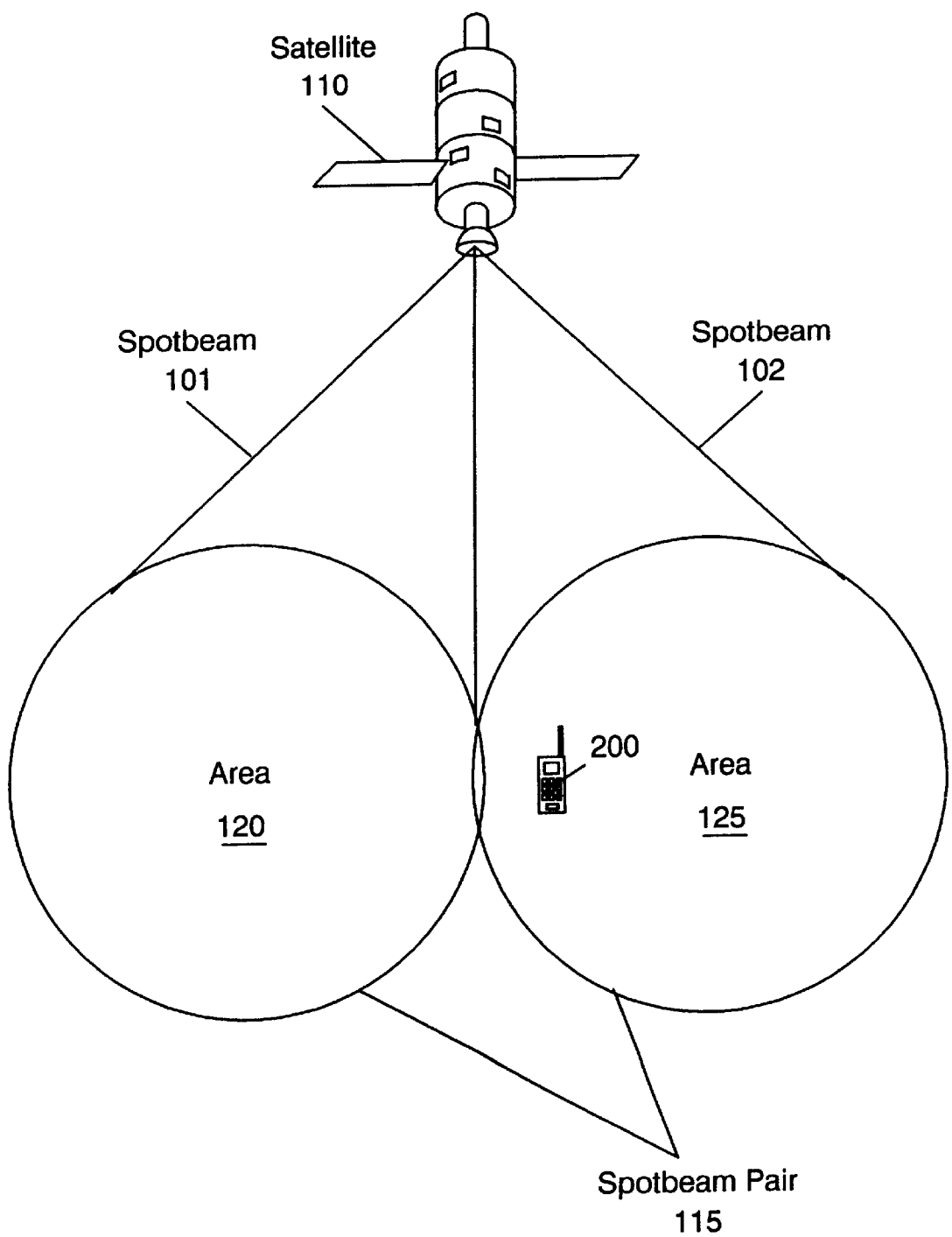
FIG. 1A is block diagram of a satellite communications system according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

FIG. 2 illustrates a satellite system utilizing the present invention. Satellite 310 projects spot beams 301 and 302 to provide communication service to user terminal 500 within areas 320 and 325. Each spot beam may be identified using a unique single location area code (LAC). The single LAC is broadcast on a control channel within each spot beam. The satellite system also groups pairs of spot beams which are adjacent. For example, spot beam 310 and spot beam 315 may comprise a spot beam pair 315. The spot beam pair 315 also has a unique beam pair LAC. Each spot beam within the satellite system may broadcast a list of beam pair LACs wherein each beam pair LAC included in the list identifies a beam pair which includes the respective spot beam and an adjacent spot beam. For example, spot beam 325 may broadcast a beam pair LAC list which includes the LAC corresponding to the spot beam pair 315. The user terminal 500 registers with the satellite system according to the spot beam LAC providing service. For example, if spot beam 301 provides service to the user terminal 500, the user terminal registers with the satellite system using the LAC corresponding to spot beam 301. Similarly, if beam pair 315 provides service to the user terminal 500, the user terminal registers with the satellite system using the LAC corresponding to beam pair 315.

Figure 3:
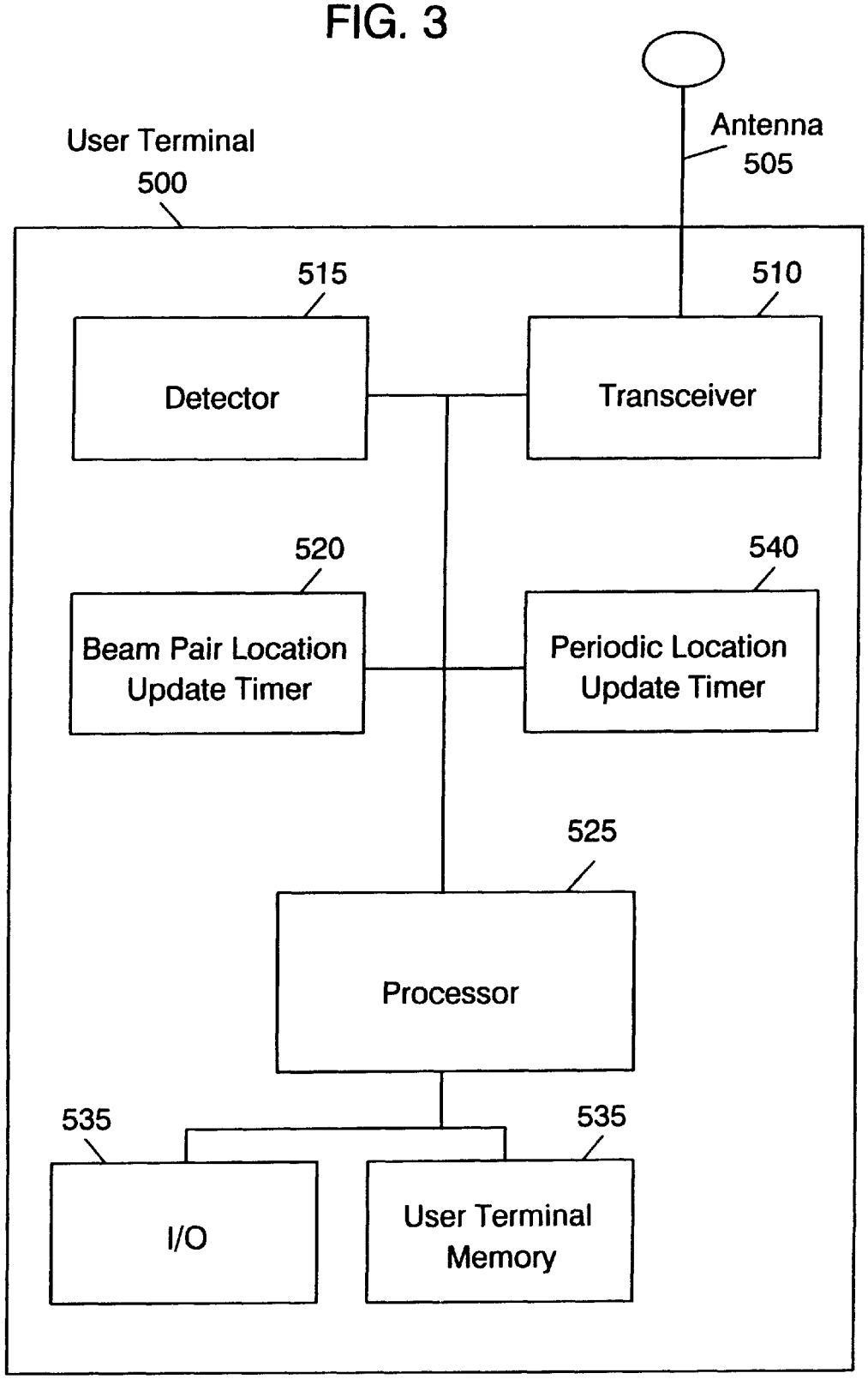
FIG. 3 is a block diagram of a user terminal according to FIG. 3.

Referring now to FIG. 3, the user terminal 500 may be a communications device, such as a radio telephone, which is capable of communicating with the satellite communications system. The user terminal 500 can alternately be a personal computer, a personal digital assistant, or other electronic device adapted to provide communications with the satellite communications system. Furthermore, the user terminal can have dual functionality such that the user terminal can also provide communications with a terrestrial communications system such as a cellular radio telephone system. The user terminal 500 can include an antenna 505 for broadcasting and receiving communications between the satellite 310 and the user terminal 500. The transceiver 510 accepts communications for transmission to the satellite and accepts received communications. The detector 515 detects the signal strength of spot beams accepted by the transceiver 510. The beam pair location update timer 520 measures time associated with a change in spot beam service. The periodic location update timer 540 measures the time elapsed since the last location update procedure was performed. The processor 525 manages the user terminal operations and coordinates the operation of the components described herein. The user terminal memory 535 stores information for the operation and management of the user terminal 500. The user terminal memory 535 may be a non-volatile memory. The I/O 530 provides general purpose input and output functions for the user terminal 500. For example, the I/O 530 may provide a keypad, a display, and speaker for the user terminal 500.

The user terminal 500 detects the location area codes broadcast by the spot beam currently providing service to the user terminal 500 by monitoring the control channel associated with the spot beam. The user terminal 500 then registers with the satellite system and stores the single LAC and the beam pair LAC list broadcast by the current spot beam. User terminal 500 may receive the single LAC identifying spot beam 302, as well as a beam pair LAC list which identifies the spot beams pairs in which spot beam 302 is included, register using the single LAC identifying spot beam 302, and store the single LAC and the beam pair LAC list. For example, spot beam 302 broadcasts a beam pair LAC list which includes the beam pair LAC corresponding to beam pair 315. Spot beam 301 broadcasts a beam pair LAC list which also includes the LAC corresponding to beam pair 315. Thus, if spot beam coverage of the user terminal 500 changes, the user terminal 500 may determine that its service is presently provided by a spot beam which is paired with the spot beam previously providing service, by determining that each beam pair LAC list includes a common beam pair LAC such as a beam pair LAC for spot beam pair 315.

The user terminal 500 can be registered for service with a spot beam or a spot beam pair via a location update procedure. The location update procedure is a communications protocol whereby the user terminal 500 may notify the satellite communications system of the user terminal's location within the geographic region covered by a spot beam communications or spot beam pair. A location update procedure can be performed when the user terminal 500 moves to a new area and requires re-registration with a spot beam in the new area. The user terminal may initiate the location update procedure when the user terminal 500 detects that the signal strength of its present spot beam is less powerful than that of another spot beam.

The user terminal may determine that a location update is presently unnecessary if spot beam coverage has changed to a beam pair. For example, if the comparison described above indicates that spot beam coverage is currently provided by a spot beam included in a beam pair with the spot beam with which the user terminal is currently registered, the shift in spot beam coverage detected by the user terminal 500 may be due to an oscillation associated with an inclined orbit. Alternatively, the change in coverage may be due to movement of the user terminal 500. If the change in coverage is due to movement of the user terminal 500, the user terminal 500 may re-register with the satellite system as being located within area 320 served by spot beam 301. If, however, the change in coverage is due to an oscillation, the user terminal 500 may register with the spot beam pair 315 and requests for communication, such as pages, subsequently directed to user terminal 500 will be carried by both spot beam 301 and spot beam 302.

If the change in coverage detected by the user terminal 500 is due to an inclined orbit, the user terminal 500 may experience periodic oscillations in the coverage. The user terminal 500 then initiates a beam pair location update timer 520 wherein the beam pair location timer has a duration longer than the period of oscillation of the satellite spot beam. Thus, if the user terminal 500 experienced shifts in spot beam coverage due to oscillation. a subsequent shift in spot beam coverage should occur prior to the expiration of the beam pair location timer. If, however, the beam pair location update timer 520 expires prior to user terminal 500 experiencing a subsequent shift in spot beam coverage, the user terminal 500 assumes that the prior shift in coverage was due to movement of the user terminal 500. When the user terminal 500 detects a shift in spot beam coverage prior to the expiration of the beam pair location update timer, the user terminal 500 reinitiates the beam pair location update timer. This anticipates that the user terminal may be in the area subject to oscillating coverage due to the inclined orbit. If so, coverage will transition back to the original spot beam within some predetermined period. Therefore, the user terminal initiates a beam pair location update timer which has a duration greater than the period of oscillation associated with the inclined orbit and the coverage should transition back to the original servicing spot beam before the beam pair location update timer 520 expires. If the user terminal is not in an area affected by the oscillation, the beam pair location update timer will expire before the user terminal detects a transition in coverage back to the original spot beam and the user terminal will register with the new spot beam. If the user terminal remains in the area subject to oscillating coverage, the user terminal will remain registered with the spot beam pair. The beam pair location update timer 520 will then be re-initiated each time the coverage transitions between spot beams making up the spot beam pair.

The methods and systems according to the present invention can be used to further reduce the number of location updates performed when the user terminal terminates communications with the satellite communications system while registered with a spot beam pair and later re-establishes communications within an area covered by the same spot beam pair. When communications are re-established in systems according to the prior art, the user terminal may detect the servicing spot beam's single LAC and register with that single LAC. If the user terminal is located in an area of oscillating coverage, the user terminal may then re-register with the spot beam pair as described above.

According to the present invention, however, the LAC of spot beam pair 315 is stored in the user terminal memory as the present registration. Upon re-establishing communication, the user terminal 500 compares the LAC stored in the user terminal's memory to the beam pair LAC list currently broadcast by the servicing spot beam. If the LAC stored in the user terminal's memory matches a beam pair LAC included in the beam pair LAC list broadcast by the servicing spot beam, the user terminal 500 re-registers with the same beam pair. The present invention, therefore, can register using one location update procedure. It should be understood that termination can include any termination of communications between the user terminal and the satellite communications system which results in a change of registration information kept by the system such as switching to a terrestrial system (such as a cellular system), or being turned off, or a power failure.

The present invention can be used to reduce the number of location updates performed by prioritizing location update procedures initiated by the periodic timer and the beam pair location update timer. The location update procedures generated by the two timers are prioritized such that the location update procedures initiated by the location update beam pair timer are given priority over the location update procedures initiated by the periodic location update timer. Therefore, a pending periodic location update may be ignored when a beam pair location update is performed in response to the expiration of the beam pair location update timer. A location update procedure may be pending due to the user terminal's inability to communicate with the satellite system because of the user terminal's signaling status or due to radio conditions. After performing the beam pair location update, the periodic location update timer 540 is re-initiated.

Alternatively, if both timers expire simultaneously, the user terminal 500 may perform a beam pair location update and the periodic timer is re-initiated. Subsequently, when the location update periodic timer 540 expires, the location update is performed using the same LAC used for the prior beam pair location update. If, however, the periodic location update timer 540 expires and the beam pair location update timer 520 is still running, the location update may be performed without any effect on the status of the beam pair location update timer 520.

Figure 4A:
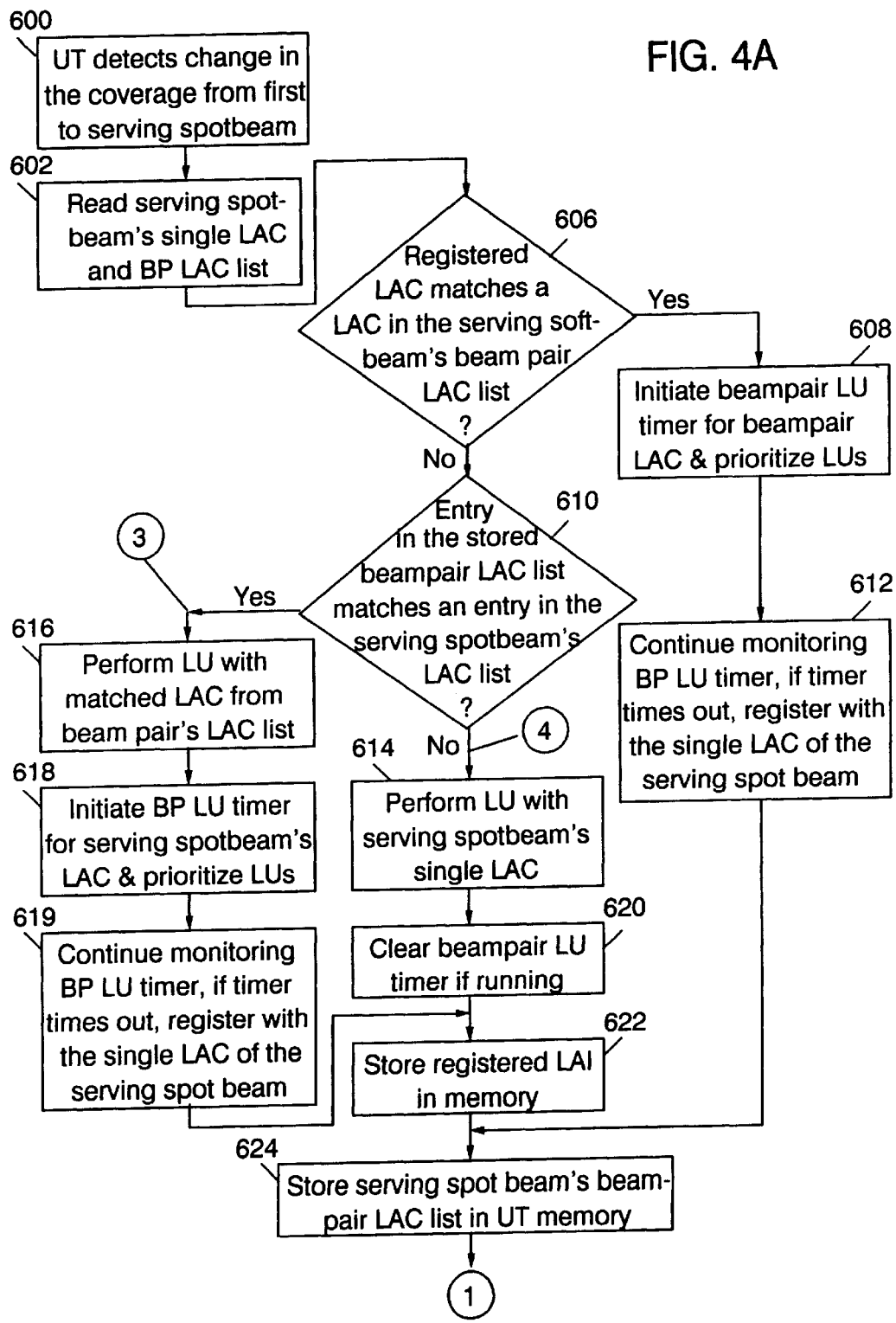
FIGS. 4A, 4B, and 4C are flowcharts illustrating operations of satellite communications systems according to the present invention.
Figure 4B:
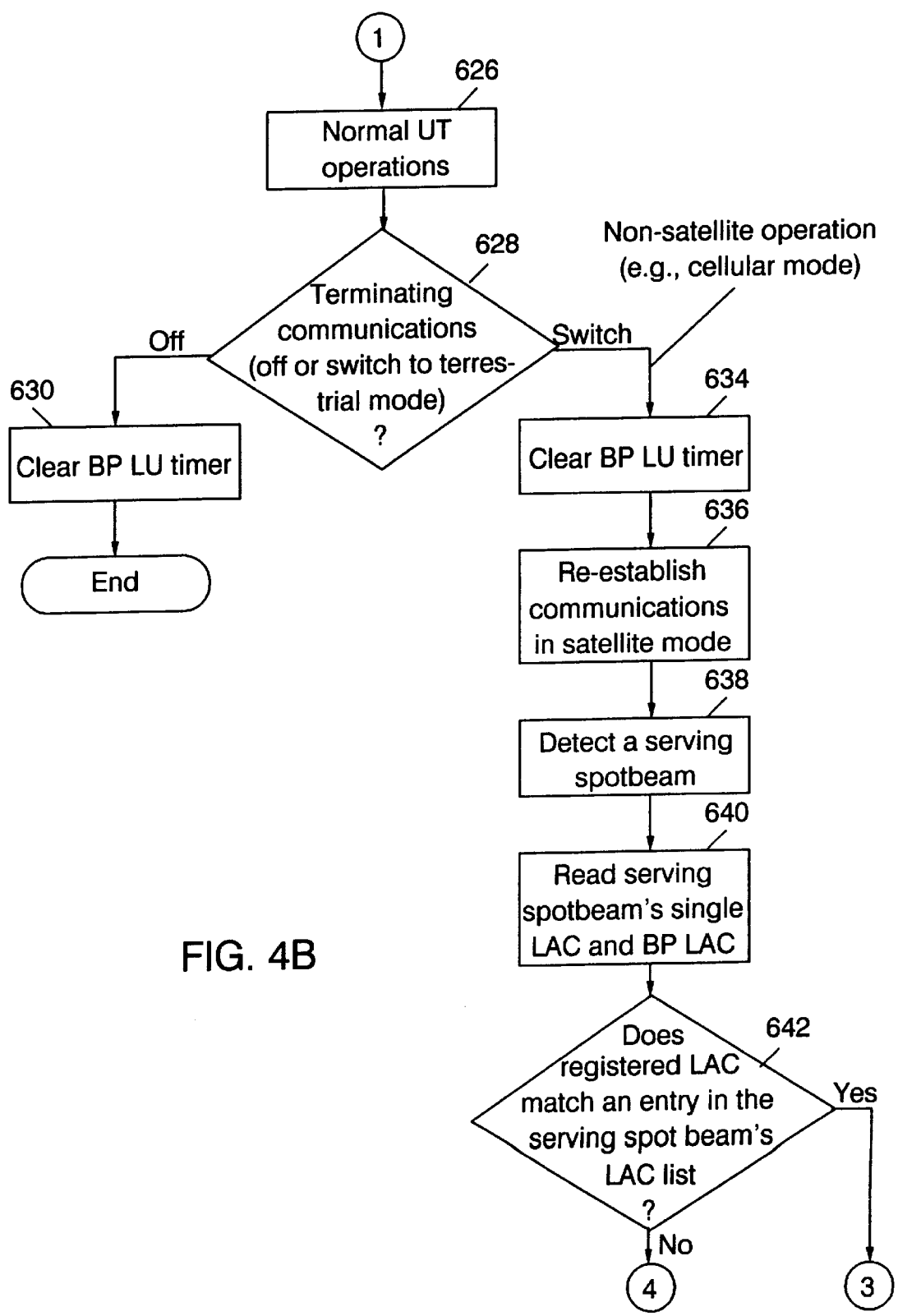
Figure 4C:
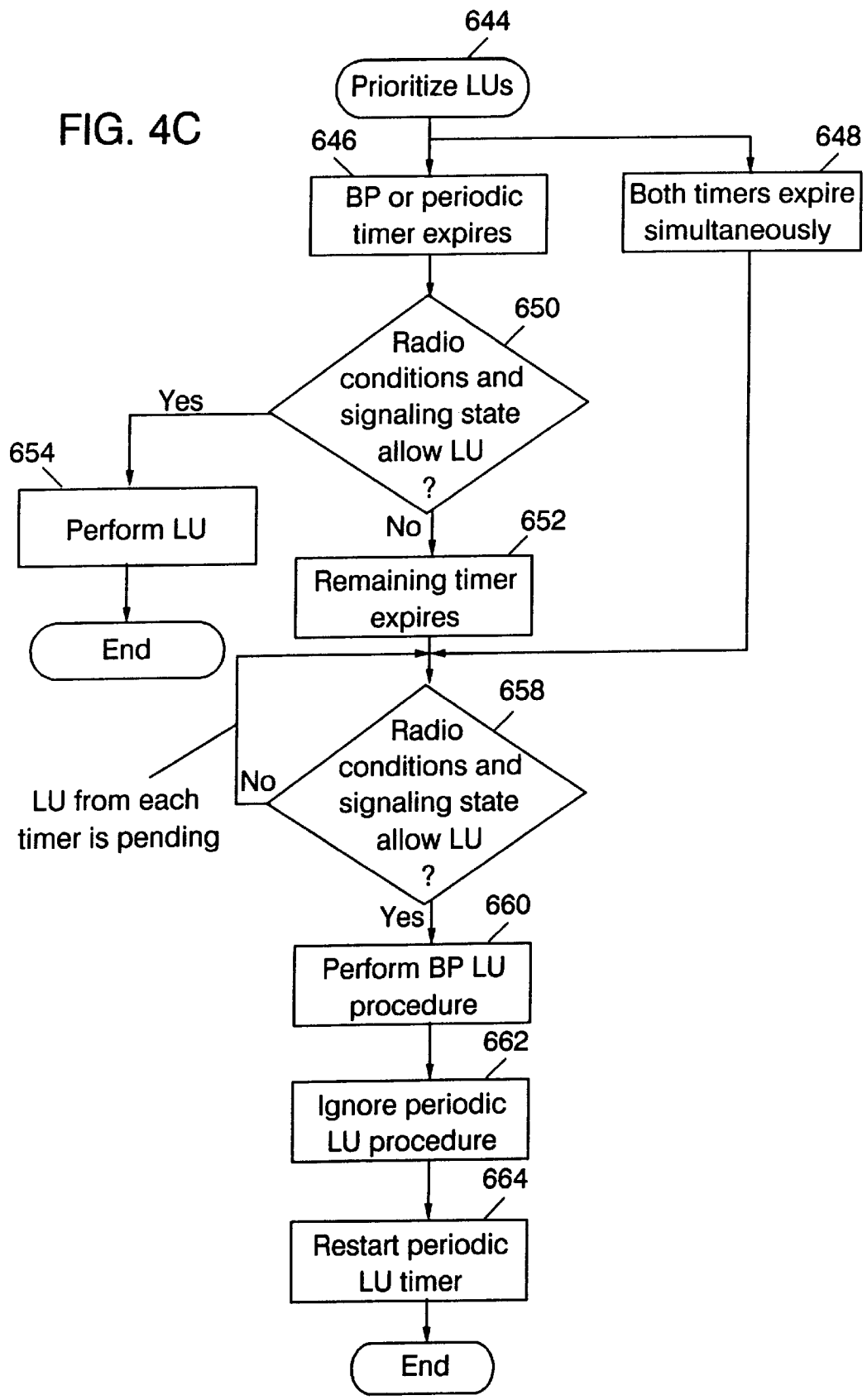

FIGS. 4A, 4B and 4C are flowchart illustrations of operations of the present invention. It will be understood that each block of the flowchart illustrations, and combinations of blocks in the flowchart illustrations, can be implemented by computer program instructions. These program instructions may be provided to a processor(s) within the satellite communications system and/or user terminal, such that the instructions which execute on the processor(s) create means for implementing the functions specified in the flowchart block or blocks. The computer program instructions may be executed by the processor(s) to cause a series of operational steps to be performed by the processor(s) to produce a computer implemented process such that the instructions which execute on the processor(s) provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Referring now to FIGS. 4A, 4B, and 4C, the user terminal detects a change in the coverage from the first spot beam to the serving spot beam (block 600). The user terminal reads the serving spot beam's LAC and beam pair LAC list (block 602) and determines whether the registered LAC is equal to any of the LACs in the serving spot beam's beam pair LAC list (block 606). If the registered LAC is equal to one of the LACs in the serving spot beam's beam pair LAC list, the user terminal is currently registered with the beam pair which includes the first spot beam and the serving spot beam. The user terminal initiates a beam pair location update timer and (block 608) grants beam pair location update procedures priority over any coincident periodic location update procedures as described in FIG. 4C. The beam pair location update timer is monitored thereafter during normal user terminal operations (block 612). If the beam pair location update timer times out, the user terminal re-registers with the single LAC of the serving spot beam. If the user terminal detects a change in the serving spot beam coverage before the beam pair location update timer times out, processing re-starts at block 600.

Now referring back to block 606, if the user terminal determines that the user terminal is not currently registered with a beam pair, the user terminal determines whether the beam pair LAC list stored in the user terminal has a common entry with the serving spot beam's LAC list (block 610). If a common beam pair is found, the user terminal is being serviced by a spot beam which forms a pair with the first spot beam. The user terminal registers with the beam pair by performing a location update using the LAC for the beam pair (block 616) and initiates a beam pair location update timer for the serving spot beam's LAC and grants beam pair location update procedures priority over any coincident periodic location update procedures as described in FIG. 4C (block 618). The beam pair location update timer is monitored thereafter during normal user terminal operations (block 619). If the beam pair location update timer times out, the user terminal re-registers with the single LAC of the serving spot beam. If the user terminal detects a change in the serving spot beam coverage before the beam pair location update timer times out, processing re-starts at block 600. The user terminal stores the Location Area Indicator (LAI) (block 622) and the beam pair LAC list for the serving spot beam (block 622) in the user terminal memory. The user terminal then continues normal operations (block 626).

Now referring back to block 610, if the beam pair LAC list stored within the user terminal does not contain the entry broadcast by the serving spot beam's location area code, the user terminal is being serviced by a new spot beam which does not form a pair with the spot beam previously serving the user terminal. Consequently, the user terminal registers with the serving spot beam by performing a location update with the serving spot beam's single LAC (block 614) and clears the beam pair location update timer if running (block 620). The user terminal then stores the registered LAI in the user terminal's memory (block 622).

Referring now to FIG. 4B, during normal user terminal operations (block 626), the user terminal may be instructed to terminate communications with the satellite system (block 628). Termination may include switching the user terminal off or switching to a terrestrial communications system such as a cellular communications system. If the user terminal is switched off, the user terminal clears the beam pair location update timer, if running (block 630), and terminates operations. If the user terminal switches to terrestrial communications mode (block 628), the user terminal clears the beam pair location update timer (block 634) and waits for communications to be re-established in satellite mode (block 636). Upon re-establishing communications in satellite mode (block 636), the user terminal detects the serving spot beam and reads the single LAC and beam pair LAC list (block 640). If the registered LAC stored by the user terminal is equal to an entry in the beam pair LAC list (block 642), the user terminal performs a location update with the matched beam pair location area code (block 616), initiates a beam pair location update timer for the servicing spot beam's LAC and grants beam pair location update procedures priority over any coincident periodic location update procedures as described in FIG. 4C (block 618). If, however, the registered LAC is not equal to an entry in the beam pair LAC list (block 642), current service is being provided by a spot beam which does not form a beam pair with the prior servicing spot beam. Consequently, the user terminal may perform a location update with the servicing spot beam's single LAC (block 614).

Referring now to FIG. 4C, the present invention prioritizes location updates originated by the beam pair location update timer and the periodic location update timer (block 644). If either the beam pair or periodic location timer expires (block 646) and radio conditions or signaling state do not allow a location update to proceed (block 650), the user terminal waits until radio conditions or the signaling state allow a location update to occur. If radio conditions and the signaling state allow a location update procedure to proceed (block 650), the corresponding location update will be performed (block 654). If, however, the remaining timer expires (block 652) before the radio conditions or signaling allow a location update to proceed (block 658), both timers will be pending.

When the radio conditions or the signaling state allow a location update procedure, the user terminal performs the location update procedure associated with the beam pair location timer (block 660). The user terminal then ignores the expiration of the periodic timer and the corresponding location update procedure (block 662). The user terminal then re-starts the periodic location update timer (block 664).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of registering a user terminal with a satellite communications system including a plurality of satellite spot beam transmitters wherein each of the satellite spot beam transmitters defines a respective spot beam wherein a periodic oscillation of two adjacent ones of the satellite spot beam transmitters results in a change of geographic coverage for the respective adjacent spot beams so that the user terminal can be alternatingly covered by one of the first and second spot beams when the user terminal is stationary, said method comprising the steps of:

determining that the user terminal is alternatingly covered by one of the first and second spot beams;

registering the user terminal with a spot beam pair registration for both the first and second adjacent spot beams;

storing the spot beam pair registration in memory;

terminating communications operations between the user terminal and the satellite communications system;

reestablishing communications operations between the user terminal and the satellite communications system; and reregistering the user terminal with the stored spot beam pair registration from memory.

2. A method according to claim 1 wherein said reregistering step is preceded by the steps of:

determining a match between the stored spot beam pair registration and one of a plurality of spot beam pairs for a spot beam currently covering the user terminal.

3. A method of registering a user terminal with a satellite communications system including a plurality of satellite spot beam transmitters wherein each of the satellite spot beam transmitters defines a respective spot beam wherein a periodic oscillation of two adjacent ones of the satellite spot beam transmitters results in a change of geographic coverage for the respective adjacent spot beams so that the user terminal can be alternatingly covered by the first and second spot beams when the user terminal is stationary, the method comprising the steps of:

determining that the user terminal is alternatingly covered by the first and second spot beams, wherein the step of determining that the user terminal is alternatingly covered by the first and second spot beams comprises the steps of:
    detecting a change at the user terminal of coverage from the first spot beam to the second adjacent spot beam;
    comparing a list of spot beam pairs for the first spot beam with a list of spot beam pairs for the second spot beam;
    registering the user terminal with a spot beam pair registration for both the first and second adjacent spot beams;
    initiating a beam pair location update timer wherein said beam pair location update timer has a duration longer than the period of oscillation of the satellite spot beam transmitters; and
    registering the user terminal with a single spot beam registration when the beam pair location update timer times out; and
registering the user terminal with a spot beam pair registration for both the first and second adjacent spot beams;
storing the spot beam pair registration in memory;
terminating communications operations between the user terminal and the satellite communications system;
reestablishing communications operations between the user terminal and the satellite communications system; and
reregistering the user terminal with the stored spot beam pair registration from memory.

4. A method according to claim 3 further comprising the step of:
    resetting the beam pair location update timer when communications between the user terminal and the satellite communications system are terminated.

5. A method according to claim 3 further comprising the steps of:
    initiating a periodic update timer wherein a duration of said periodic update timer is greater than a duration of said beam pair location update timer;
    performing a periodic location update when said periodic update timer times out; and
    reinitiating the periodic update timer when the beam pair location update timer times out.

6. A method of registering a user terminal with a satellite communications system including a plurality of satellite spot beam transmitters wherein each of the satellite spot beam transmitters defines a respective spot beam wherein a periodic oscillation of two adjacent ones of the satellite spot beam transmitters results in a change of geographic coverage for the respective adjacent spot beams so that the user terminal can be alternatingly covered by the first and second spot beams when the user terminal is stationary, said method comprising the steps of:
    detecting a change at the user terminal of coverage from the first spot beam to the second adjacent spot beam;
    registering the user terminal with a spot beam pair registration for both the first and second adjacent spot beams;
    initiating a beam pair location update timer wherein said beam pair location update timer has a duration longer than the period of oscillation of the satellite spot beam transmitters;
    registering the user terminal with a single spot beam registration when the beam pair location update timer times out;
    initiating a periodic update timer wherein a duration of said periodic update timer is greater than a duration of said beam pair location update timer;
    performing a periodic location update when said periodic update timer times out; and
    reinitiating the periodic update timer when the beam pair location update timer times out.

7. A method according to claim 6 wherein said beam pair location update timer is given a higher priority than said periodic update timer so that a the single spot beam registration is performed and the periodic update timer is reinitiated without performing the periodic location update when both the periodic update timer and the beam pair location timer time out.

8. A method according to claim 6 further comprising the step of:
    resetting the beam pair location update timer when communications between the user terminal and the satellite communications system are terminated.

9. A method according to claim 6 further comprising the steps of:
    storing the spot beam pair registration in memory;
    terminating communications operations between the user terminal and the satellite communications system;
    reestablishing communications operations between the user terminal and the satellite communications system; and
    reregistering the user terminal with the stored spot beam pair registration from memory.

10. A method of registering a user terminal with a satellite communications system including a plurality of satellite spot beam transmitters wherein each of the satellite spot beam transmitters defines a respective spot beam wherein a periodic oscillation of a first and second adjacent ones of the satellite spot beam transmitters results in a change of geographic coverage for the respective adjacent spot beams so that the user terminal can be alternatingly covered by one of the first and second spot beams when the user terminal is stationary, said method comprising the steps of:
    detecting a change at the user terminal of coverage from the first spot beam to the second adjacent spot beam, wherein the user terminal can be alternatingly covered by one of the first and second spot beams when the user terminal is stationary;
    registering the user terminal with a spot beam pair registration for both the first and second adjacent spot beams;
    initiating a beam pair location update timer wherein said beam pair location update timer has a duration longer than the period of oscillation of the satellite spot beam transmitters;
    registering the user terminal with a single spot beam registration when the beam pair location update timer times out; and
    resetting the beam pair location update timer when communications operations between the user terminal and the satellite communications system are terminated.

11. A method according to claim 10 wherein the user terminal is a dual mode user terminal capable of operating with the satellite communications system and capable of operating with a terrestrial communications system, and wherein the communications operations between the user terminal and the satellite communications system are terminated when the user terminal transitions to communications operations with the terrestrial communications system.

12. A method according to claim 11 wherein the terrestrial communications system comprises a cellular communications system.

13. A method according to claim 10 wherein the communications operations between the user terminal and the satellite communications system are terminated when the user terminal is turned off.

14. A method according to claim 10 wherein said registering step comprises registering the user terminal with the single spot beam registration when the beam pair location update timer times out without detecting another change of the user terminal coverage during the duration of the timer.

15. A method according to claim 10 further comprising the step of:

maintaining the spot beam pair registration for the user terminal when a change of the user terminal coverage is detected during the duration of the beam pair location update timer; and reinitiating the beam pair location update timer.

16. A method according to claim 10 further comprising the step of:

storing the spot beam pair registration in a user terminal memory before terminating communications operations;

reestablishing communications operations between the user terminal and the satellite communications system after terminating communications operations; and reregistering the user terminal with the stored spot beam pair registration.

17. A method according to claim 16 wherein said reregistering step is preceded by the steps of:

determining a match between the stored spot beam pair registration and one of a plurality of spot beam pairs for a spot beam currently covering the user terminal.

18. A method of registering a user terminal with a satellite communications system including a plurality of satellite spot beam transmitters wherein each of the satellite spot beam transmitters defines a respective spot beam wherein a periodic oscillation of a first and second adjacent ones of the satellite spot beam transmitters results in a change of geographic coverage for the respective adjacent spot beams so that the user terminal can be alternatingly covered by the first and second spot beams when the user terminal is stationary, said method comprising the steps of:

detecting a change at the user terminal of coverage from the first spot beam to the second adjacent spot beam;

registering the user terminal with a spot beam pair registration for both the first and second adjacent spot beams;

initiating a beam pair location update timer wherein said beam pair location update timer has a duration longer than the period of oscillation of the satellite spot beam transmitters;

registering the user terminal with a single spot beam registration when the beam pair location update timer times out;

resetting the beam pair location update timer when communications operations between the user terminal and the satellite communications system are terminated, wherein the method further comprises the steps of:

initiating a periodic update timer wherein a duration of said periodic update timer is greater than a duration of said beam pair location update timer;

performing a periodic location update when said periodic update timer times out; and reinitiating the periodic update timer when the beam pair location update timer times out.

19. A method according to claim 18 wherein said beam pair location update timer is given a higher priority than said periodic update timer so that the single spot beam registration is performed and the periodic update timer is reinitiated without performing the periodic location update when both the periodic update timer and the beam pair location timer time out.

20. A method according to claim 10, further comprising the step of comparing a list of spot beam pairs for the first spot beam with a list of spot beam pairs for the second spot beam.

21. A mobile user terminal for communicating with a satellite communications system including a plurality of satellite spot beam receivers and a plurality of satellite spot beam transmitters wherein each of the satellite spot beam transmitters defines a respective spot beam wherein a periodic oscillation of first and second adjacent ones of the satellite spot beam transmitters results in a change of geographic coverage for first and second respective adjacent spot beams so that the user terminal can be alternatingly covered by one of the first and second spot beams when the user terminal is stationary, said user terminal comprising:

a transceiver which receives satellite communications from one of the spot beam transmitters and which transmits communications to one of the satellite spot beam receivers;

a detector coupled to said transceiver wherein said detector detects a change of coverage from the first spot beam to the second adjacent spot beam, wherein the user terminal can be alternatingly covered by one of the first and second spot beams when the user terminal is stationary;

a processor coupled to said detector wherein said processor registers the user terminal with a spot beam pair registration for both the first and second spot beams;

a beam pair location update timer coupled to said processor wherein said beam pair location update timer has a duration longer than the period of oscillation of the satellite spot beam transmitters, wherein said beam pair location update timer is initiated responsive to said registration with said spot beam pair, wherein said beam pair location update timer triggers said processor to register the user terminal with a single spot beam registration when said beam pair location update timer times out, and wherein said beam pair location update timer is reset when communications between said user terminal and the satellite communications system are terminated.

22. A user terminal according to claim 21 wherein the user terminal is a dual mode user terminal capable of communicating with the satellite communications system and capable of communicating with a terrestrial communications system, and wherein the communications operations between the user terminal and the satellite communications system are terminated when the user terminal transitions to communications operations with the terrestrial communications system.

23. A user terminal according to claim 22 wherein the terrestrial communications system comprises a cellular communications system.

24. A user terminal according to claim 21 wherein the communications operations between the user terminal and the satellite communications system are terminated when the user terminal is turned off.

25. A user terminal according to claim 21 wherein said processor registers the user terminal with the single spot beam registration when the beam pair location update timer times out without detecting another change of the user terminal coverage during the duration of the timer.

26. A user terminal according to claim 21 wherein said processor maintains the spot beam pair registration for the user terminal and reinitiates the beam pair location update timer when a change of the user terminal coverage is detected during the duration of the beam pair location update timer.

27. A mobile user terminal for communicating with a satellite communications system including a plurality of satellite spot beam receivers and a plurality of satellite spot beam transmitters wherein each of the satellite spot beam transmitters defines a respective spot beam wherein a periodic oscillation of first and second adjacent ones of the satellite spot beam transmitters results in a change of geographic coverage for first and second respective adjacent spot beams so that the user terminal can be alternatingly covered by the first and second spot beams when the user terminal is stationary, said user terminal comprising:

- a transceiver which receives satellite communications from one of the spot beam transmitters and which transmits communications to one of the satellite spot beam receivers;
- a detector coupled to said transceiver, wherein said detector detects a change of coverage from the first spot beam to the second adjacent spot beam and wherein said detector compares a list of spot beam pairs for the first spot beam with a list of spot beam pairs for the second spot beam;
- a processor coupled to said detector wherein said processor registers the user terminal with a spot beam pair registration for both the first and second spot beams;
- a beam pair location update timer coupled to said processor wherein said beam pair location update timer has a duration longer than the period of oscillation of the satellite spot beam transmitters, wherein said beam pair location update timer is initiated responsive to said registration with said spot beam pair, wherein said beam pair location update timer triggers said processor to register the user terminal with a single spot beam registration when said beam pair location update timer times out, and wherein said beam pair location update timer is reset when communications between said user terminal and the satellite communications system are terminated.

28. A user terminal for communicating with a satellite communications system including a plurality of satellite spot beam receivers and a plurality of satellite spot beam transmitters wherein each of the satellite spot beam transmitters defines a respective spot beam wherein a periodic oscillation of first and second adjacent ones of the satellite spot beam transmitters results in a change of geographic coverage for first and second respective adjacent spot beams so that the user terminal can be alternatingly covered by one of the first and second spot beams when the user terminal is stationary, said user terminal comprising:

- a transceiver which receives satellite communications from one of the spot beam transmitters and which transmits communications to one of the satellite spot beam receivers;
- a detector coupled to said transceiver wherein said detector detects that said user terminal is alternatingly covered by one of the first and second spot beams;
- a processor coupled to said detector wherein said processor registers the user terminal with a spot beam pair registration for both the first and second adjacent spot beams responsive to detection of said alternating coverage; and
- user terminal memory which stores said spot beam pair registration wherein upon termination of communications operations between said user terminal and said satellite communications system followed by reestablishing communications operations between said user terminal and the satellite communications system, said processor reregisters said user terminal with said spot beam pair registration stored in said memory.

29. A user terminal according to claim 28 further comprises a comparator which determines a match between the stored spot beam pair registration and one of a plurality of spot beam pairs for a spot beam currently covering the user terminal.

30. A user terminal according to claim 28 wherein said processor resets a beam pair location update timer when communications operations between the user terminal and the satellite communications system are terminated.

31. A user terminal for communicating with a satellite communications system including a plurality of satellite spot beam receivers and a plurality of satellite spot beam transmitters wherein each of the satellite spot beam transmitters defines a respective spot beam wherein a periodic oscillation of first and second adjacent ones of the satellite spot beam transmitters results in a change of geographic coverage for first and second respective adjacent spot beams so that the user terminal can be alternatingly covered by the first and second spot beams when the user terminal is stationary, said user terminal comprising:

- a transceiver which receives satellite communications from one of the spot beam transmitters and which transmits communications to one of the satellite spot beam receivers;
- a detector coupled to said transceiver wherein said detector detects that said user terminal is alternatingly covered by the first and second spot beams;
- a processor coupled to said detector wherein said processor registers the user terminal with a spot beam pair registration for both the first and second adjacent spot beams responsive to detection of said alternating coverage;
- user terminal memory which stores said spot beam pair registration wherein upon termination of communications operations between said user terminal and said satellite communications system followed by reestablishing communications operations between said user terminal and the satellite communications system, said processor reregisters said user terminal with said spot beam pair registration stored in said memory; and
- the user terminal further comprising a periodic update timer wherein a duration of said periodic update timer is greater than a duration of a beam pair location update timer, wherein said periodic update timer triggers said processor to perform a periodic location update when said periodic update timer times out, and wherein said periodic update timer is reinitiated responsive to said time out of said beam pair location update timer.

32. A mobile user terminal for communicating with a satellite communications system including a plurality of satellite spot beam receivers and a plurality of satellite spot beam transmitters wherein each of the satellite spot beam transmitters defines a respective spot beam wherein a periodic oscillation of first and second adjacent ones of the satellite spot beam transmitters results in a change of geographic coverage for first and second respective adjacent spot beams so that the user terminal can be alternatingly covered by the first and second spot beams when the user terminal is stationary, said user terminal comprising:

a transceiver which receives satellite communications from one of the spot beam transmitters and which transmits communications to one of the satellite spot beam receivers;

a detector coupled to said transceiver wherein said detector detects that said user terminal is alternatingly covered by the first and second spot beams;

a processor coupled to said detector wherein said processor registers the user terminal with a spot beam pair registration for both the first and second adjacent spot beams responsive to detection of said alternating coverage;

a beam pair location update timer coupled to said processor wherein said beam pair location update timer has a duration longer than the period of oscillation of the satellite spot beam transmitters, wherein said beam pair location update timer is initiated responsive to said registration with said spot beam pair, and wherein said beam pair location update timer triggers said processor to register the user terminal with a single spot beam registration when said beam pair location update timer times out; and a periodic update timer wherein a duration of said periodic update timer is greater than a duration of said beam pair location update timer, wherein said periodic update timer triggers said processor to perform a periodic location update when said periodic update timer times out, and wherein said periodic update timer is reinitiated responsive to said time out of said beam pair location update timer.

33. A user terminal according to claim 32 wherein said beam pair location update timer is given a higher priority than said periodic update timer so that a the single spot beam registration is performed and the periodic update timer is reinitiated without performing the periodic location update when both the periodic update timer and the beam pair location timer time out.

34. A user terminal according to claim 32 wherein said beam pair location update timer is reset when communications operations between said user terminal and the satellite communications system are terminated.

35. A user terminal according to claim 32 further comprising a user terminal memory which stores said spot beam pair registration wherein upon termination of communications operations between said user terminal and said satellite communications system followed by reestablishing communications operations between said user terminal and the satellite communications system, said processor reregisters said user terminal with said spot beam pair registration stored in said memory.

* * * * *